United States Patent
Larsson et al.

(10) Patent No.: US 10,212,686 B2
(45) Date of Patent: Feb. 19, 2019

(54) METHOD AND ARRANGEMENT FOR POSITIONING IN A WIRELESS COMMUNICATIONS SYSTEM

(75) Inventors: Daniel Larsson, Solna (SE); Peter Bengtsson, Sundbyberg (SE); Margaretha Forsgren, Kista (SE); Oskar Mauritz, Johanneshov (SE); Olof Sjöbergh, Järfälla (SE)

(73) Assignee: Lenovo Innovations Limited (Hong Kong), Hong Kong (CN)

( * ) Notice: Subject to any disclaimer, the term of this patent is extended or adjusted under 35 U.S.C. 154(b) by 0 days.

(21) Appl. No.: 13/256,047

(22) PCT Filed: Jun. 25, 2009

(86) PCT No.: PCT/SE2009/050808
§ 371 (c)(1),
(2), (4) Date: Sep. 12, 2011

(87) PCT Pub. No.: WO2010/104437
PCT Pub. Date: Sep. 16, 2010

(65) Prior Publication Data
US 2012/0002609 A1 Jan. 5, 2012

Related U.S. Application Data

(60) Provisional application No. 61/159,988, filed on Mar. 13, 2009.

(51) Int. Cl.
*H04W 64/00* (2009.01)
*G01S 5/02* (2010.01)

(52) U.S. Cl.
CPC .......... *H04W 64/00* (2013.01); *G01S 5/0205* (2013.01)

(58) Field of Classification Search
CPC . H04W 64/00; H04L 27/2647; H04L 27/2613
(Continued)

(56) References Cited

U.S. PATENT DOCUMENTS

| 7,158,503 B1* | 1/2007 | Kalliojarvi et al. .......... 370/347 |
| 2002/0018514 A1* | 2/2002 | Haynes ................ H04B 1/7183 |
| | | 375/130 |

(Continued)

FOREIGN PATENT DOCUMENTS

| WO | 01/05163 A2 | 1/2001 |
| WO | WO 0105163 A2 * | 1/2001 |

OTHER PUBLICATIONS

3rd Generation Partnership Project. "On OTDOA in LTE." 3GPP TSG-RAN WG1 #55bis, R1-090353, Ljubljana, Slovenia, Jan. 12-19, 2009.

(Continued)

*Primary Examiner* — Asad M Nawaz
*Assistant Examiner* — Syed Ali
(74) *Attorney, Agent, or Firm* — Kunzler Bean & Adamson

(57) ABSTRACT

Systems and methods provide for an increase in hearability by a user equipment (UE, 116). This increase in hearability can be used to improve positioning results. Two different types of positioning subframes can be transmitted by cells in a radio access network (RAN) to improve hearability: measurement subframes and low-interference subframes. The selection of which type of positioning subframe to transmit can be determined algorithmically by the transmitting entity.

19 Claims, 9 Drawing Sheets

(58) Field of Classification Search
USPC .......................................................... 370/328
See application file for complete search history.

(56) References Cited

U.S. PATENT DOCUMENTS

| | | | | |
|---|---|---|---|---|
| 2003/0100267 | A1* | 5/2003 | Itoh | H04L 1/0009 455/69 |
| 2009/0175179 | A1* | 7/2009 | Stewart | H04L 27/2613 370/252 |
| 2010/0195566 | A1* | 8/2010 | Krishnamurthy | H04L 5/0007 370/328 |
| 2010/0273502 | A1* | 10/2010 | Uemura et al. | 455/452.2 |
| 2010/0279638 | A1* | 11/2010 | Lindoff | 455/226.1 |
| 2011/0286349 | A1* | 11/2011 | Tee | H04W 64/00 370/252 |
| 2011/0319025 | A1* | 12/2011 | Siomina et al. | 455/63.1 |
| 2012/0122478 | A1* | 5/2012 | Siomina et al. | 455/456.1 |
| 2013/0028161 | A1* | 1/2013 | Maeda | H04L 5/0048 370/311 |
| 2013/0040675 | A1* | 2/2013 | Ant | H04W 52/226 455/509 |
| 2013/0064219 | A1* | 3/2013 | Siomina | H04W 64/00 370/331 |
| 2013/0070625 | A1* | 3/2013 | Fujishima | H04W 36/20 370/252 |
| 2013/0114434 | A1* | 5/2013 | Muruganathan | H04W 16/14 370/252 |
| 2013/0114441 | A1* | 5/2013 | Yoo | H04L 1/0026 370/252 |
| 2013/0121222 | A1* | 5/2013 | Luo et al. | 370/311 |
| 2013/0182583 | A1* | 7/2013 | Siomina | H04W 24/10 370/252 |

OTHER PUBLICATIONS

3rd Generation Partnership Project. "On OTDOA Method for LTE Positioning." TSG-RAN WG1 #56, R1-090918, Athens, Greece, Feb. 9-13, 2009.

3rd Generation Partnership Project. "DL OTDOA Framework." 3GPP TSG RAN WG1 Meeting #57, R1-092010, San Francisco, CA, USA, May 4-8, 2009.

3rd Generation Partnership Project. "WF on RAN1 Concept for OTDOA." 3GPP TSG RAN WG1 Meeting #57, R1-092213, San Francisco, CA, USA, May 4-8, 2009.

3rd Generation Partnership Project. "LS on Framework for OTDOA Positioning in LTE." 3GPP TSG RAN WG1 Meeting #57, R1-092281, San Francisco, CA, USA, May 4-8, 2009.

* cited by examiner

METHOD AND ARRANGEMENT FOR POSITIONING IN A WIRELESS COMMUNICATIONS SYSTEM

TECHNICAL FIELD

The present invention relates generally to systems and methods for positioning in a wireless communications system. In particular, the present invention relates to methods and arrangements for transmitting positioning subframes.

BACKGROUND

During the past years, the interest in using mobile and landline/wireline computing devices in day-to-day communications has increased. Desktop computers, workstations, and other wireline computers currently allow users to communicate, for example, via e-mail, video conferencing, and instant messaging (IM). Mobile devices, for example, mobile telephones, handheld computers, personal digital assistants (PDAs), etc., also allow the users to communicate via e-mail, video conferencing, IM, and the like. Mobile telephones have conventionally served as voice communication devices, but through technological advancements they have recently proved to be effective devices for communicating data, graphics, etc. Wireless and landline technologies continue to merge into a more unified communication system, as user demand for seamless communications across different platforms increases.

Considering wireless devices, one feature that has been introduced over the years is positioning which enables the location of an end user device to be determined by the network. For example, third generation cellular systems may be equipped with one or more of a number of different positioning methods which enable location services to the cellular subscribers. Some positioning methods currently in use include: Cell identity (Cell-ID) positioning; Enhanced cell identity (Ecell-ID) positioning; Assisted Global Positioning System (A-GPS) positioning; Observed downlink time difference of arrival—with idle periods in the downlink (OTDOA-IPDL) positioning; and Uplink time difference of arrival (UTDOA) positioning. Each of these positioning methods is briefly described below.

Cell-ID positioning determines the cell to which a user equipment (UE) is currently connected and uses that cell location as a rough approximation of the UE's current position. The position of the user is then determined with some amount of cell granularity. Although somewhat imprecise, the Cell-ID positioning method is considered to be the backbone of cellular positioning systems since it is always available for a UE that is connected to the RAN and is technically simple to implement.

Ecell-ID positioning augments the Cell-ID positioning technique with auxiliary information that narrows down the within the cell where the UE is located. Auxiliary information that can be used, for example, from a wideband code division multiple access (WCDMA) system, is the round trip time (RTT) measurement. The RTT measurement determines the travel time from the radio base station (RBS) to the UE and back. Using the speed of light, the distance from the known position of the RBS to the UE can be calculated, which results in a ring around the RBS within which the UE is located. The thickness of the ring is determined by the measurement uncertainty. The Ecell-ID method recognizes that the UE is located both in the cell and, more specifically, in the ring around the RBS and determines that the UE is located within a zone described by the intersecting areas of these two geographical regions.

A-GPS positioning is an enhancement of the United States' military global positioning system (GPS). GPS reference receivers attached to, e.g., a cellular communication system, collect assistance data, that, when transmitted to GPS receivers in terminals connected to the cellular communication system, enhances the performance of the GPS terminal receivers. Typically, A-GPS accuracy can become as accurate as within 10 meters without differential operation. The accuracy decreases in dense urban areas and indoors, where the sensitivity of the GPS receivers is not high enough for detection of the relatively weak signals from the GPS satellites. The method is relatively accurate and meets the North American emergency positioning E-911 requirements of 50 meters for 67% of all positionings and 150 meters for 95% of all positionings A concern with the A-GPS positioning technique is the limited indoor coverage due to the low ranging signal strengths that are typically obtained at ground level.

OTDOA-IPDL positioning is similar to A-GPS in that it relies on time difference of arrival measurements. However, the OTDOA-IPDL method uses UE measurements of pilot radio, or Common Pilot Channel (CPICH) in WCDMA, signals transmitted from several RBSs. The measurement results are signaled to the RNC, where a hyperbolic trilateration method is used for calculation of the position of the UE. In order to enhance the hearability of the RBSs' signals in the UE, it is also possible to use IPDL to attenuate the transmissions from the RBS to which the UE is connected. This reduces the interference and hence enhances the hearability of other RBSs. Additionally, OTDOA-IPDL theoretically provides better indoor coverage than A-GPS.

Another positioning method is UTDOA positioning. UTDOA, like OTDOA-IPDL, is similar to A-GPS in that UTDOA also relies upon time difference of arrival measurements. However, the UTDOA method also uses RBS or separate location measurement unit (LMU) measurements of signals transmitted from the positioned UE. The transmitted signal is detected in a number of RBSs or LMUs, after which the measured results are signaled to a positioning node where the position of the UE is determined by a trilateration method. In order to detect the time of arrival from measurements of opportunity from the UE, a reference signal first needs to be created in a master LMU or master RBS. This can be done by decoding the signal followed by reconstruction of the chip stream that then forms the reference signal. When compared to A-GPS, UTDOA positioning typically provides better indoor coverage but typically provides inferior outdoor accuracy.

One issue with terrestrial time difference of arrival methods, e.g., OTDOA-IPDL and UTDOA, involves the receiver sensitivity when positioning is considered. Theoretically, these methods can provide a 3D position from four time of arrival measurements, i.e., the equivalent of three time difference of arrive measurements or pseudo-measurements. However, radio propagation conditions are less beneficial for these terrestrial time difference of arrival methods when compared with A-GPS since their ranging signals propagate along the surface of the Earth, whereas A-GPS signals propagate from above. These terrestrial positioning methods therefore suffer more from non-line-of-sight (LOS) propagation and multipath propagation. This results in outlier measurements, whose suppression requires the availability of excess detections, i.e., detections from significantly more than the minimum number of RBSs. In practice, to achieve a useful positioning accuracy, at least 6-8 RBSs need to be detected in the UE when OTDA-IPDL positioning is used. For UTDOA positioning at least 6-8 RBSs need to detect the UE transmissions in order to obtain useful position estimates in practical environments.

The consequence of the above, i.e., sensitivity and propagation path issues, is that more remote RBSs need to be detected for OTDOA-IPDL or to do the detecting for UTDOA. This means that lower signal strengths need to be detected with high probability. Calculations typically show that signals need to be detected down to about −40 dB C/I. Further, the pre-detection step needs to enhance the signal to about 11-13 dB C/I in order to achieve a sufficiently low false rate. In essence, the processing gain for positioning purposes in any CDMA system needs to be substantially 50-55 dB for terrestrial positioning to be useful. This processing gain is significantly more than what is needed for other services, which may lead one to consider that positioning sensitivity requirements need to be assessed at the definition phase of the air-interface.

Accordingly, for new generations of mobile communication systems, as well as to improve currently used mobile communication systems, methods and systems to improve the hearability of signals used for positioning purposes are desirable.

SUMMARY

Exemplary embodiments relate to systems and methods for improving positioning accuracy in a wireless communications system. Two, for example, types of positioning subframes are considered and transmitted in a desired fashion. Advantages according to exemplary embodiments described herein include, for example, improved hearability of measurement signals by a user equipment (UE). However, it will be appreciated by those skilled in the art that such advantages are not to be construed as limitations of the present invention except to the extent that they are explicitly recited in one or more of the appended claims.

According to an exemplary embodiment a method for transmitting a positioning subframe in a wireless communication network includes: processing a function which uses at least one parameter as input to generate a numeric output; determining which type of positioning subframe to transmit based on the numeric output, wherein the positioning subframe is one of a measurement subframe and a low-interference subframe; and transmitting the positioning subframe.

According to another exemplary embodiment a network node for transmitting a positioning subframe in a wireless communication network includes: a processor for processing a function which uses at least one parameter as input to generate a numeric output and determining which type of positioning subframe to transmit based on the numeric output, wherein the positioning subframe is one of a measurement subframe and a low-interference subframe; and a subframe transmitting unit for transmitting the positioning subframe.

According to another exemplary embodiment a method for performing measurements by a user equipment (UE) includes: receiving a threshold value associated with a probability that a received positioning subframe will be a measurement subframe; calculating, based upon the received threshold value, when a positioning subframe received from a cell will be a measurement subframe; and measuring the cell, based upon the calculation, when receiving the measurement subframe.

According to another exemplary embodiment a user equipment (UE) includes: a transceiver for receiving a threshold value associated with a probability that a received positioning subframe will be a measurement subframe; and a processor configured to calculate, based upon the received threshold value, when a positioning subframe received from a cell will be a measurement subframe and configured to measure the cell based upon the calculation, when receiving the measurement subframe.

BRIEF DESCRIPTION OF THE DRAWINGS

The accompanying drawings illustrate exemplary embodiments, wherein.

DETAILED DESCRIPTION

The following detailed description of the exemplary embodiments refers to the accompanying drawings. The same reference numbers in different drawings identify the same or similar elements. Also, the following detailed description does not limit the invention. Instead, the scope of the invention is defined by the appended claims.

For new generations of mobile communication systems as well as to improve currently used mobile communication systems, methods and systems to improve the hearability of signals used for positioning purposes are desirable. For the purpose of this disclosure, the phrase "low-interference subframe" is to be interpreted as a subframe which causes no interference, or a limited amount of interference, with other subframes transmitted by another base station, e.g., another evolved NodeB (eNB), on the same frequency resource. In practice, a low-interference subframe could, for example, be a subframe which has no data scheduled in it, which has no data scheduled in a part or parts of it, or which has less than the maximum possible amount of data scheduled in it, in a part or parts of it. Furthermore, a low-interference subframe may include no reference signals, no reference signals in part of the subframe, or a reduced number of reference signals in all or part of the subframe.

Also for the purpose of this disclosure, the phrase "a measurement subframe" is to be interpreted as a subframe including at least one reference symbol (sometimes denoted as reference symbol, position reference symbol, pilot symbol or pilot signal) to enable measurements to be performed, e.g., by a user equipment (UE). The phrase "positioning subframe" refers herein to a subframe intended for positioning purposes. A positioning subframe may be either a low-interference subframe or a measurement subframe. The phrase "cell identifier" refers herein to a unique identifier for a particular cell in a wireless communications network. Non-limiting examples of cell identifiers include the physical-layer cell-identity group or the physical-layer cell identity in conjunction with a time-dependent cell specific parameter. Prior to discussing the exemplary systems and methods for improving hearability according to exemplary embodiments, a wireless communication network within which such systems and methods can be used will now be described with respect to FIG. 1.

Figure 1:
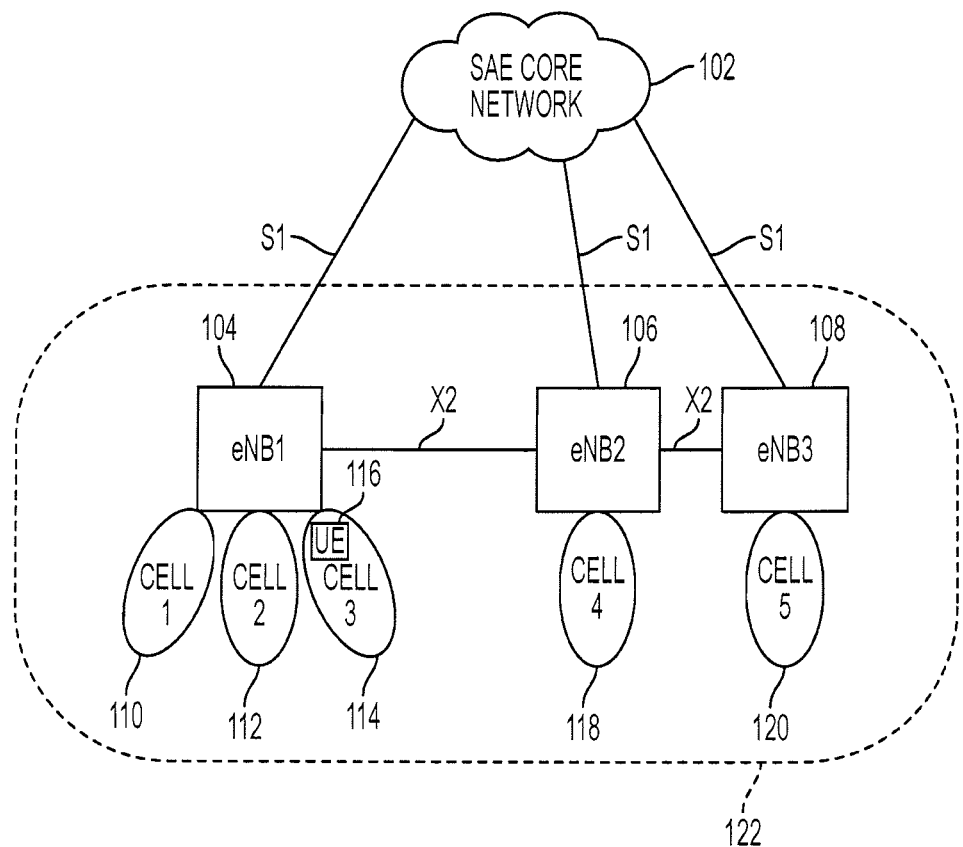
FIG. 1 illustrates a System Architecture Evolution (SAE) Core Network and a Long Term Evolution (LTE) Radio Access Network (RAN) according to exemplary embodiments.

FIG. 1 shows an exemplary communication network which includes a System Architecture Evolution (SAE) Core Network 102 in communication with a Long Term Evolution (LTE) Radio Access Network (RAN) 122 which includes eNBs 104, 106 and 108 over an S1 interface. The eNBs 104, 106 and 108 can also communicate between themselves over the X2 interface. Functions of the SAE Core Network 102 include, but are not limited to, subscriber management, mobility management and interconnection to external networks, e.g., the Internet. The LTE RAN 122 supports/controls the functions of radio resource management, handover and standard physical layer functions. Within the LTE RAN 122, eNB1 104 supports three cells, i.e., cell1 110, cell2 112 and cell3 114, eNB2 106 supports cell4 118 and eNB3 108 supports cell5 120. UE 116 is operating in cell3 114. Also while being shown as being within the umbrella of the LTE RAN 122, UE 116 is typically not considered to be part of the LTE RAN 122. Instead, FIG. 1 is intended to illustrate an example of where UE 116 is located within the radio communication coverage area (cell) provided by cell3 114. Based on the exemplary communication network shown in FIG. 1, a purely illustrative geographical cell relation will now be described with respect to FIG. 2.

Figure 2:
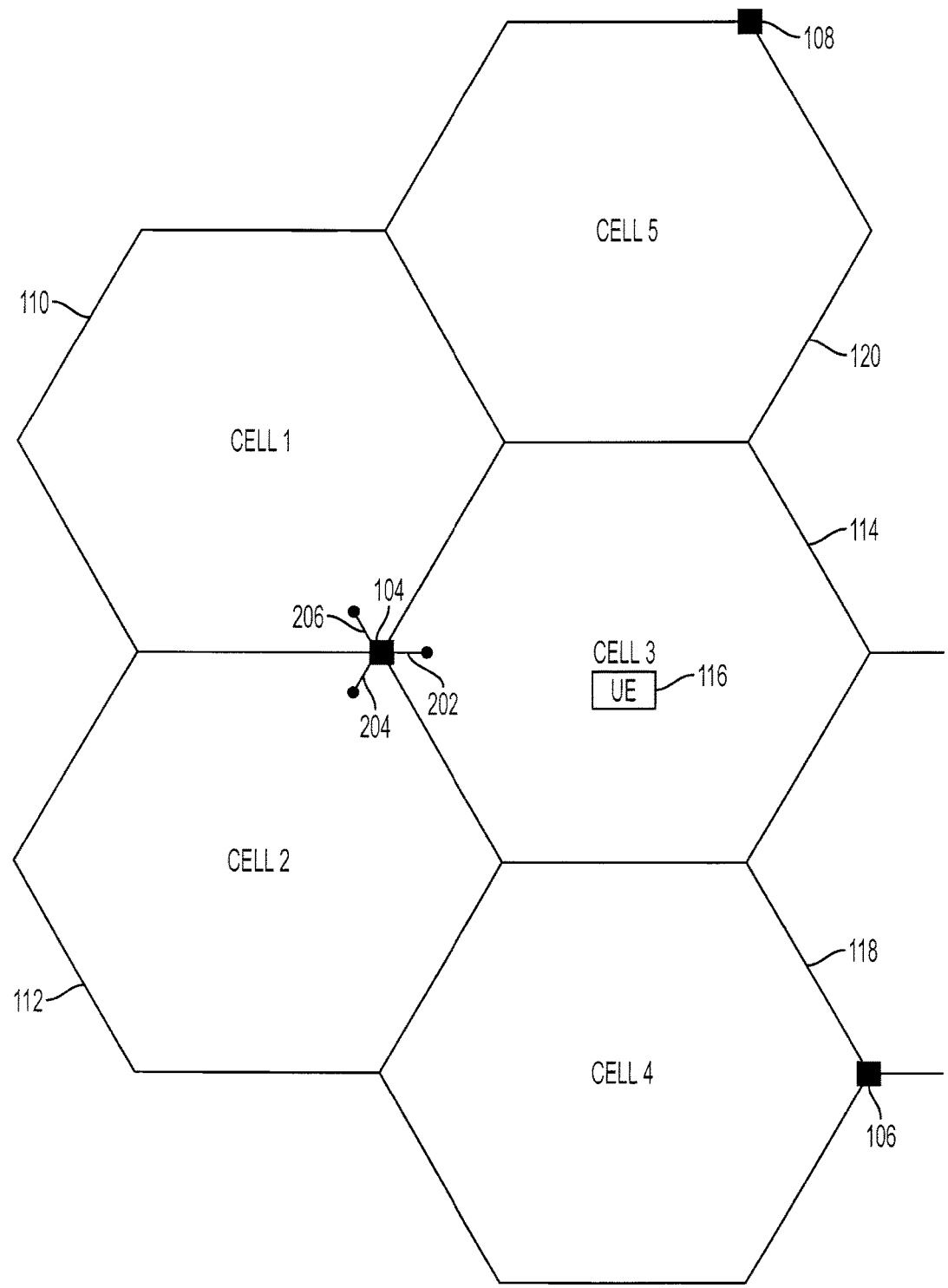
FIG. 2 depicts a cell layout according to exemplary embodiments.

According to exemplary embodiments, cells can be described as having a geographical coverage region associated with a particular eNB. For example, suppose that eNB1 104 has three (directional) antennas each associated with a single cell. Antenna 202 is associated with cell3 114, antenna 204 is associated with cell2 112 and antenna 206 is associated with cell 1 110. The eNB2 106 is associated with cell4 118 and eNB3 108 is associated with cell5 120. While these cells are shown as hexagon shaped cells, those skilled in the art will appreciate that actual cell shapes will be irregular based upon eNB locations, geographical features and antenna choices. Nonetheless, each cell will typically have neighboring cells as shown in the Figure. As shown in FIG. 2, UE 116 is located within cell3 114 which has, for example, neighboring cells 1, 2, 4 and 5.

According to exemplary embodiments, some cells in the area shown in FIG. 2 can transmit a low-interference subframe at the same time on or more other cell(s) transmit a measurement subframe. In this context, when the base station associated with a cell transmits, that cell is referred to herein as a transmitting cell. As described above, it is desirable to increase hearability since signals used for positioning need to be relatively strong relative to signals in support of other services, and if hearability is increased positioning accuracy can also be improved. Therefore, according to exemplary embodiments, methods and systems enable some cells to transmit a low-interference subframe at the same time as one or more other cells transmit a measurement subframe. This positioning enabler is desirable because it improves hearability, i.e., it increases the chance of the UE 116 to receive a signal related to positioning by reducing interference to the transmitted measurement subframe(s).

According to exemplary embodiments, a network node can automatically determine which type of positioning subframe a cell should transmit. This network node can, for example, be a base station, e.g., eNB1 104 in an LTE RAN 122. In this environment, each cell is associated with a cell identifier which can be, for example, the physical-layer cell-identity group or the physical-layer cell identity used in conjunction with a time-dependent cell-specific parameter, e.g., current system frame number, the subframe number and the slot number. Initially, in preparing to determine and transmit the desired positioning subframe, the eNB1 104 obtains the cell identifier for the cell in which the positioning frame is to be transmitted. This cell identifier may be retrieved from an internal memory or from another storage unit. The eNB 104 then determines whether to transmit, for example, a measurement subframe or a low-interference subframe depending upon the outcome of its determining process. This determining process can use various functions and parameters to generate an output which is used to determine the desired subframe to be transmitted. According to exemplary embodiments, these functions and parameters, as well as their interactions, are described below in more detail.

According to one exemplary embodiment, the determination as to whether the transmitted positioning subframe is a low-interference subframe or a measurement subframe can depend on the physical-layer cell-identity group $N^{(1)}_{ID}$. The physical-layer cell-identity group $N^{(1)}_{ID}$, may be the same for all cells with the same carrier frequency in, for example, a three sector base station, e.g., eNB 104 supporting cell1 110, cell2 112 and cell 3 114 as shown in FIG. 2. In this three sector site deployment, this exemplary embodiment allows for all cells at the same site with the same carrier frequency to follow the same pattern of low-interference subframes and measurement subframes. This can then minimize the disturbance from the closest site when a UE 116 is measuring on cells at other sites in the neighborhood, e.g., measuring from cell5 120.

According to other exemplary embodiments, the determination as to whether the transmitted positioning subframe is a low-interference subframe or a measurement subframe can instead depend on the physical-layer cell identity. This allows for handling other cell deployment scenarios where distinct cells in the neighborhood may have the same physical-layer cell-identity group.

According to some exemplary embodiments, a time varying function using the afore-described information as input can be used to determine whether the positioning subframe to be transmitted next by a given cell should be a low-interference subframe or a measurement subframe, e.g., as a function of the time-dependent cell-specific parameters such as the System Frame Number (SFN) $n_f$, the subframe number and/or the slot number as is described below.

According to exemplary embodiments the time varying function f is defined as $$f(N^{(1)}_{ID}, n_f, n_{subframe}) = \sum_{i=0}^{N-1} w_i c(i + \lfloor k_1 \cdot n_f + k_2 \cdot n_{subframe} \rfloor),$$

where N is a parameter, $k_1$ and $k_2$ are constants, $n_{subframe}$ is the subframe number, $w_i$ are weights, and $\lfloor x \rfloor$ denotes the largest number not greater than x. The pseudo-random sequence c(i) may be defined by a length-31 Gold sequence, according to the following. The output sequence c(n) of length $M_{PN}$, where n=0, 1, ..., $M_{PN}-1$, is defined by $$c(n)=(x_1(n+N_c)+x_2(n+N_c)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2$$

where $N_c=1600$ and the first m-sequence may be initialized with $x_1(0)=1$, $x_1(n)=0$, n=1, 2, ..., 30. The initialization of the second m-sequence is denoted by $c_{init}=\sum_{i=0}^{30} x_2(i) \cdot 2^i$ with the value depending on the application of the sequence. An exemplary set of values of the parameters is N=9, $k_1=10$, $k_2=1$, $w_i=2^i$. The pseudo-random sequence generator may be initialized with $c_{init}=N_{ID}^{(1)}$. In the case where $f(N_{ID}^{(1)}, n_f, n_{subframe})<T$ the positioning subframe is a measurement subframe, otherwise it is a low-interference subframe, where T is a threshold, or value, that gives the probability that the positioning subframe is a low-interference subframe. It should be noted that the exemplary pseudo-random function described above should not be construed in a limiting sense. Other random or pseudo-random functions, based on a cell identifier, such as the physical-layer cell-identity group, may also be used in connection with exemplary embodiments.

According to some exemplary embodiments, a non-random function may be used. For example, the function may involve performing a modulo operation on the SFN and/or subframe number with respect to a value based on the cell identifier. The determination as to which type of positioning subframe to transmit could then be based on the result of this modulo operation.

As described above, in some exemplary embodiments the determination of whether to transmit a low-interference subframe or a measurement subframe can depend on the physical-layer cell identity in connection with a time-dependent cell-specific parameter. In these exemplary embodiments, the physical-layer cell identity and the cell specific parameter could be used as inputs to the pseudo-random function an example of which is shown below.

$$f(N_{ID}^{cell}, n_f, n_{subframe}) = \sum_{i=0}^{N-1} w_i c(i + \lfloor k_1 \cdot n_f + k_2 \cdot n_{subframe} \rfloor),$$

where $N_{ID}^{cell}$ is the physical-layer cell identity, similar to the example using $N_{ID}^{(1)}$ above.

Other combinations and variations on the above described exemplary embodiments can also be used. For example, in one exemplary embodiment, T has the same value in the entire network and the UE 116 is informed by the eNodeB about the value of T. The UE 116 can use the value of T along with the cell identity (and/or other inputs as described above) and the time-varying function to calculate when the cells transmit measurement subframes and then the UE can only measure cells when the cells transmit measurement subframes based on its own calculations. For example, the UE can receive the value T from the system together with, or separately from, broadcast cell identity information. The UE can then retrieve the time-varying function from memory, which function may have been previously stored therein or may also have been signaled thereto from the network. The UE can then compare the received value of T with the output of the time-varying function to know when a cell is transmitting a measurement subframe or a low-interference subframe.

According to some exemplary embodiments, the communication network is not SFN synchronized, i.e., while the different base stations in the network are synchronized so that they transmit the positioning subframe at the same time instance, they do not use the same SFN number. Therefore, for a UE 116 to be able to determine whether a low-interference subframe or a measurement subframe is transmitted in a specific cell in a network that is not SFN synchronized, the UE 116 will typically have to be signaled with either an SFN offset between the serving cell and the measured cell(s) or the complete SFN timing of the measured cells.

As described above, according to exemplary embodiments, a positioning subframe can be either a measurement subframe or a low-interference subframe. Also, according to exemplary embodiments, a measurement subframe can include only positioning information, e.g., positioning reference symbols, or a measurement subframe may include information in addition to the positioning information. For example, a measurement subframe may include the positioning reference symbols as well as common reference symbols, synchronization channels, a broadcast channel and other information, or some combination of these options as desired. An example of a subframe that could be used as a low-interference subframe is a Multicast Broadcast Single Frequency Network (MBSFN) subframe as described in 3GPP release 8. However, other types of subframes could be used or created to be used as a low-interference subframe, e.g., blanked subframes, in various communications networks as desired.

Figure 3:
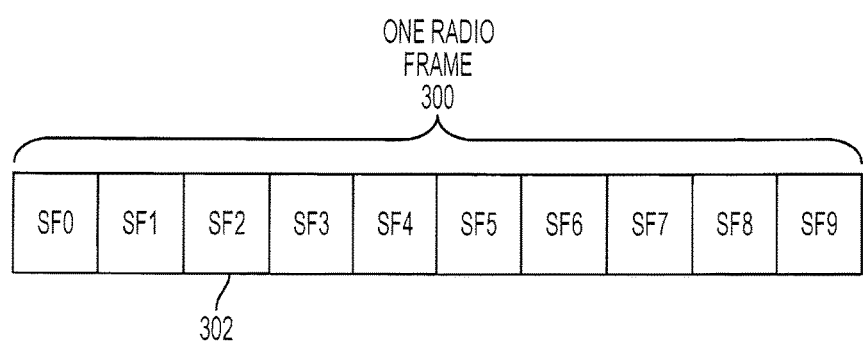
FIG. 3 shows a radio frame with its associated subframes.
Figure 4:
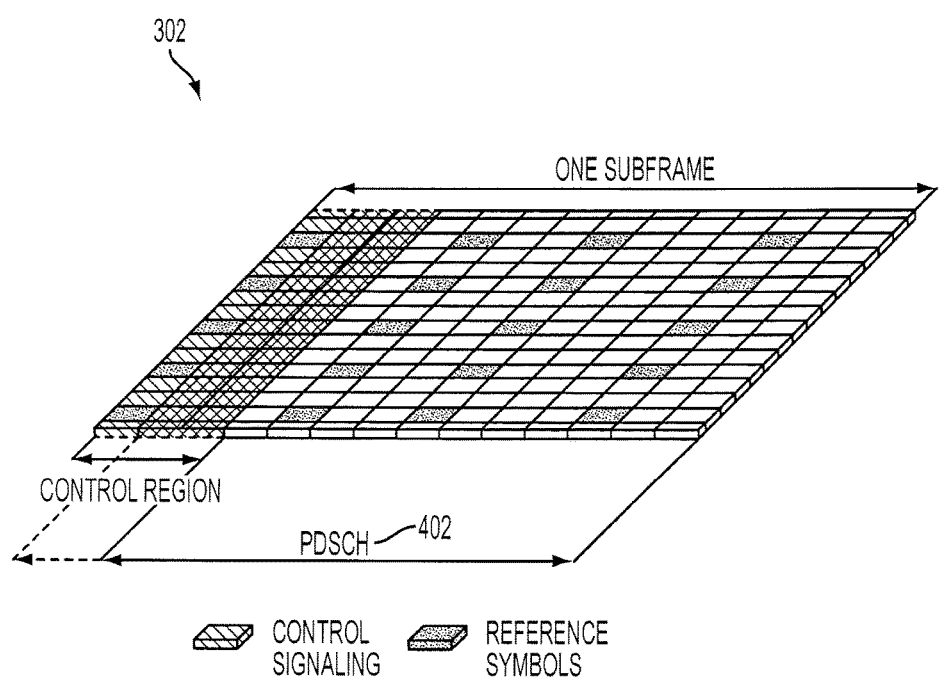
FIG. 4 shows a subframe according to exemplary embodiments.

According to exemplary embodiments, the positioning reference symbols can be located within a measurement subframe which is a part of a radio frame 300 transmitted by a base station as shown in FIG. 3. In this purely illustrative example, subframe2 302 is a downlink subframe which includes one or more positioning subframes. The contents of the positioning subframe as, e.g., either a measurement subframe or a low-interference subframe, can be determined as described above. An example of a downlink subframe is shown as subframe2 302 in FIG. 4. The positioning subframe can, for example, be transmitted within the Physical Downlink Shared Channel (PDSCH) 402. Alternatively, other locations within the subframe2 302 could be used to contain the positioning subframe. It will be appreciated by those skilled in the art that the frame and subframe formats shown in FIGS. 3 and 4 are purely exemplary and that the present invention can be adopted to other transmit formats.

Figure 5:
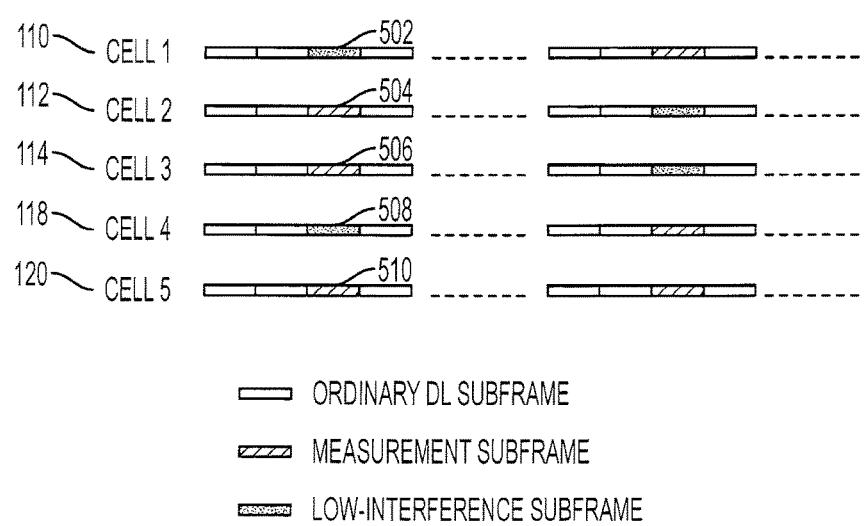
FIG. 5 illustrates a transmission pattern.

As described above, various positioning subframes can be transmitted by cells. FIG. 5 shows an example of positioning subframes. For example, cell1 110 is transmitting a low-interference subframe in positioning subframe 502, cell2 112 is transmitting a measurement subframe in positioning subframe 504, cell3 114 is transmitting a measurement subframe in positioning subframe 506, cell4 116 is transmitting a low-interference subframe in positioning subframe 508 and cell5 118 is transmitting a measurement subframe in positioning subframe 510. Another signalling pattern which further improves hearability for UE 116, in certain network topologies, by using at least one of the exemplary embodiments described herein will now be described with respect to FIG. 6.

Figure 6:
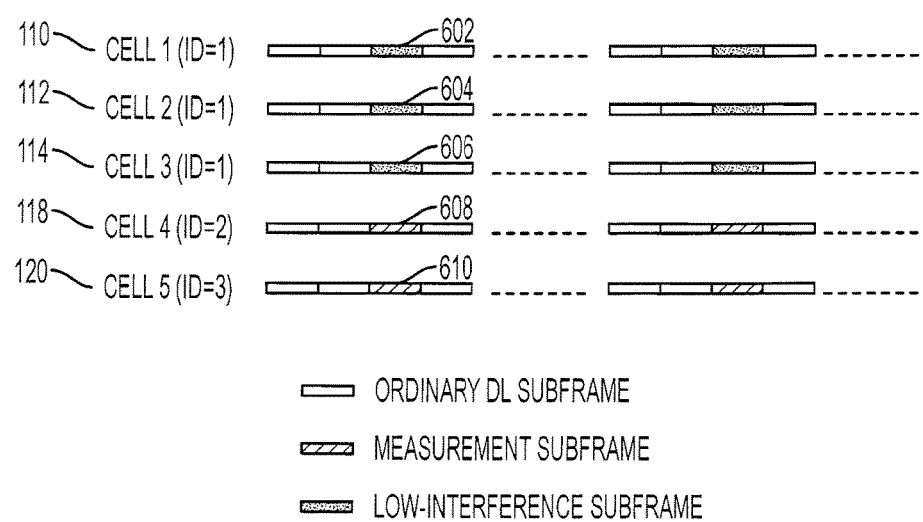
FIG. 6 shows a planned transmission pattern according to exemplary embodiments.

According to exemplary embodiments, FIG. 6 shows a purely illustrative example of a resulting subframe layout using one of the exemplary determination methods described above associated with the cell identifier. Cell1 110, cell2 112 and cell3 114 all share the same cell identifier, e.g., are controlled by the same eNB 104, whereas cell4 116 and cell5 118 have different cell identifiers. Based on having the same cell identifier, e.g., id=1, cell1 110, cell2 112 and cell3 114 each transmit a low-interference sub frame in their respective same time instance as shown by positioning subframes 602, 604 and 604. By way of contrast, cell4 116 and cell5 118 both transmit measurement subframes at that time instance as shown by positioning subframes 608 and 610 which are measurement subframes. (It should be noted that it would be equally possible for either one of cell4 116 or cell5 118 to transmit a low-interference subframe since, in this example, they do not have the same cell identifier). UE 116 which is being served by cell3 114, and which performs measurements in support of positioning on either one of cell4 116 or cell5 118 will thus experience little or no interference from its neighborhood cells, e.g., cell1 110 and cell2 112, as a result of the coordinated transmission of low-interference subframes in these cells.

The exemplary embodiments described above provide methods and systems for determining the type of positioning cell to be transmitted. Network node 700, e.g., eNB 104, can contain a processor 702 (or multiple processor cores), cell identifier obtaining unit 704, subframe determining unit 706, subframe transmitting unit 708, memory 710, one or more antennas 712 and one or more secondary storage devices (not shown). The cell identifier obtaining unit 704 is arranged to obtain the cell identifier for one of the at least one cell attached to the network node, e.g., from memory 710. The subframe determining unit 706 is arranged to determine whether to transmit a measurement subframe or a low-interference subframe as described in the above described exemplary embodiments. The subframe transmitting unit 708 is arranged to transmit via antenna 712 the desired positioning subframe. The subframe transmitting unit 708 can also be configured to be a transceiver for communicating with the rest of the communication network. Processor 702 is configured to execute instructions and coordinate the functions for determining and transmitting the desired positioning subframe. These instructions, e.g., computer program code, for performing the functions of the above described exemplary embodiments can be provided as a computer program product. The computer program product can be in the form of a data carrier, carrying a computer program (or programs) which is (are) loadable into the network node 700 through the desired interface. The data carrier may be in the form of a CD ROM disc, a memory stick or other desirable deliverable format to include pure program code on a server which is downloadable by the network node 700 remotely. Therefore, the network node 700 is capable of performing the functions of a base station, e.g., eNB1 104, to manage multiple cells as well as determining and transmitting the desired positioning subframe, e.g., a low-interference subframe or a measurement subframe.

Figure 7:
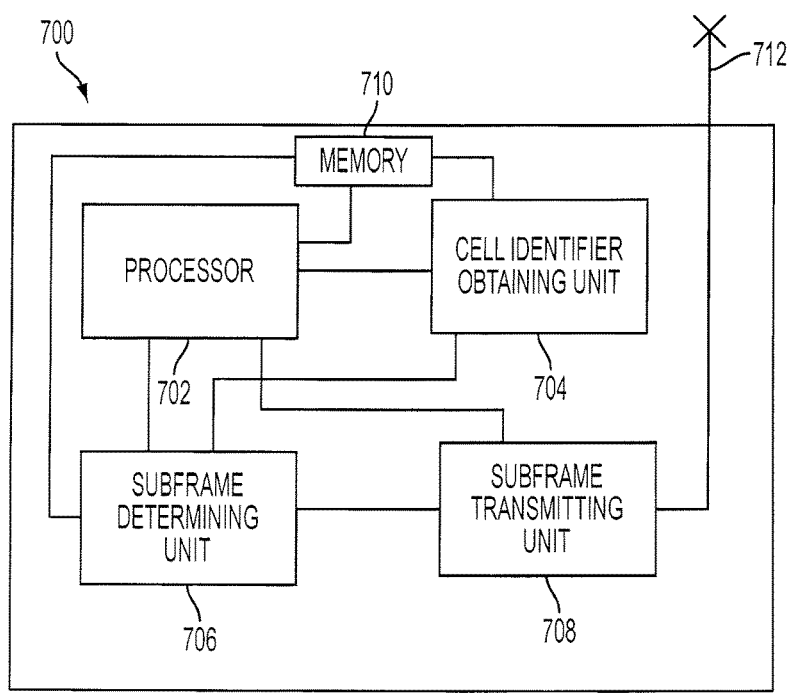
FIG. 7 depicts a network node according to exemplary embodiments.

Additionally, according to exemplary embodiments, network node 700 can be configured to also be user equipment (UE) 116 such that it can receive and process information as described above in other exemplary embodiments. In such a configuration, the UE 700 can include, for example, a transceiver (not specifically illustrated in FIG. 7) for receiving a threshold value, e.g., the value T described above, associated with a probability that a received positioning subframe will be a measurement subframe and a processor 702 configured to calculate, based upon the received threshold value, when a positioning subframe received from a cell will be a measurement subframe and configured to measure the cell based upon the calculation, when receiving the measurement subframe.

Figure 8:
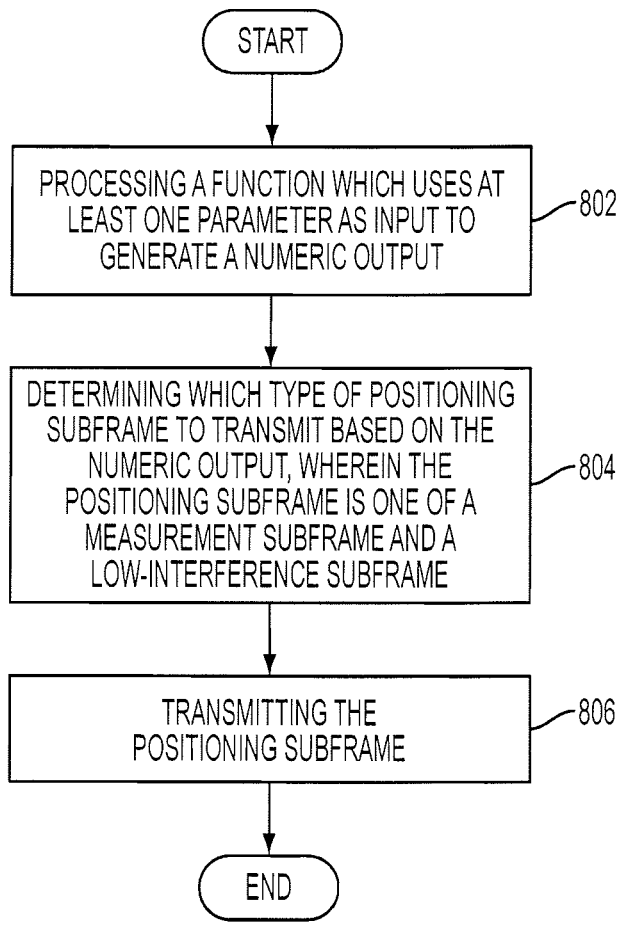
FIG. 8 shows a method flowchart according to exemplary embodiments.

Utilizing the above-described exemplary systems according to exemplary embodiments, a method for transmitting a positioning subframe is shown in the flowchart of FIG. 8. Initially a method for transmitting a positioning subframe in a wireless communication network includes: processing a function which uses at least one parameter as input to generate a numeric output in step 802; determining which type of positioning subframe to transmit based on the numeric output, wherein the positioning subframe is one of a measurement subframe and a low-interference subframe in step 804; and transmitting the positioning subframe in step 806.

Figure 9:
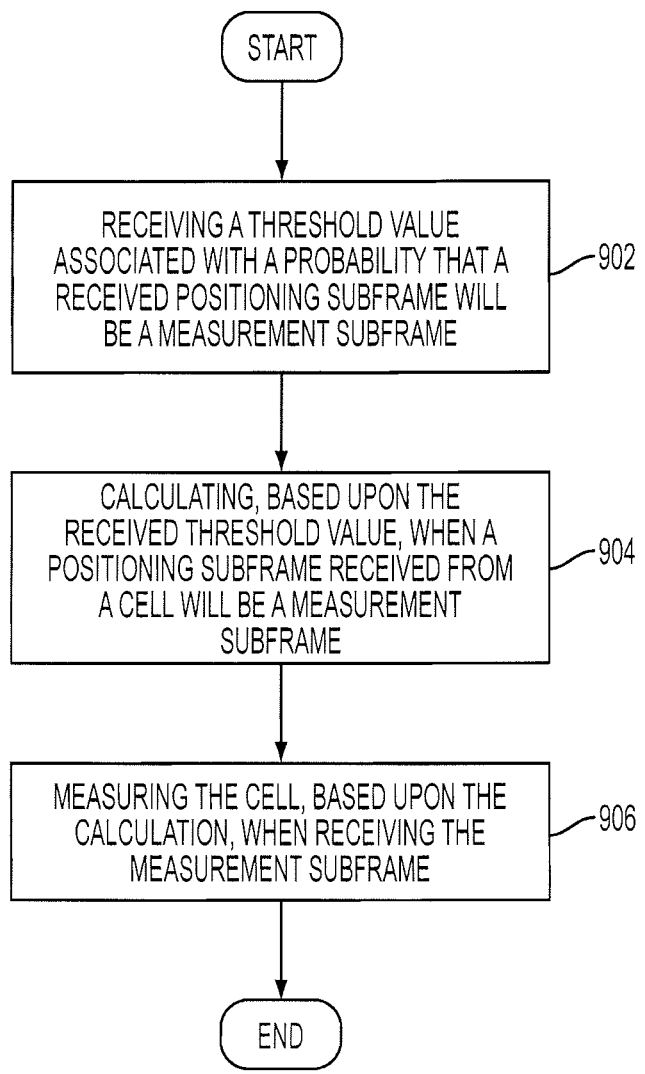
FIG. 9 shows another method flowchart according to exemplary embodiments.

Utilizing the above-described exemplary systems according to exemplary embodiments, a method for performing measurements is shown in the flowchart of FIG. 9. Initially a method for performing measurements by a user equipment (UE) includes: receiving a threshold value associated with a probability that a received positioning subframe will be a measurement subframe in step 902; calculating, based upon the received threshold value, when a positioning subframe received from a cell will be a measurement subframe in step 904; and measuring the cell, based upon the calculation, when receiving the measurement subframe in step 906.

The above-described exemplary embodiments are intended to be illustrative in all respects, rather than restrictive, of the present invention. All such variations and modifications are considered to be within the scope and spirit of the present invention as defined by the following claims. For example, while terminology from $3^{rd}$ Generation Partnership Project (3GPP) LTE has been used in this disclosure, this should not be seen as limiting the scope of the invention to only the aforementioned system, i.e., any other wireless system making use of low-interference subframes may also benefit from using the ideas covered within this disclosure. No element, act, or instruction used in the description of the present application should be construed as critical or essential to the invention unless explicitly described as such. Also, as used herein, the article "a" is intended to include one or more items.

The invention claimed is:

1. A method comprising:

determining, based on an output of a function, whether a type of the positioning subframe to transmit is to be a measurement subframe or a low-interference subframe, wherein the measurement subframe includes at least one symbol occupying a time-frequency resource on which a user equipment detects the at least one symbol; and transmitting the determined type of positioning subframe, wherein the determining comprises:

comparing the output of the function with a threshold value, wherein the output of the function is determined based on a pseudo-random sequence and network cell information, the pseudo-random sequence is determined by the following:

$c(n)=(x_1(n+N_c)+x_2(n+N_c))\mod 2$, and the threshold value is associated with a probability that the type of the positioning subframe is a low-interference subframe;

in response to the output of the function being different from the threshold value, determining that the type of the positioning subframe is a measurement subframe; and in response to the output of the function matching the threshold value, determining that the type of the positioning subframe is a low-interference subframe.

2. The method of claim 1, wherein the threshold value is common to each cell in the wireless communication network for determining the type of positioning subframe to transmit in that cell.

3. The method of claim 1, further comprising transmitting the threshold value to a user equipment configured to perform positioning measurements on positioning subframes.

4. The method of claim 1, wherein the user equipment performs positioning measurements on the at least one symbol.

5. The method of claim 1, wherein a low-interference subframe is transmitted in a cell on a frequency resource and contributes no more than minimal interference to measurement subframes transmitted by neighboring cells on that same frequency resource.

6. The method of claim 1, wherein the transmitting comprises transmitting the determined type of positioning subframe in a cell of the wireless communication network.

7. The method of claim 1, wherein a subframe has one or more parts within which data scheduled for transmission during that subframe is to be included, the data distinguished from control signaling, and wherein a low-interference subframe is a subframe which has less than a maximum possible amount of data scheduled within the one or more parts.

8. A network node configured to transmit a positioning subframe in a wireless communication network, comprising:
  a processor configured to:
    determine, based on an output of a function, whether a type of the positioning subframe to transmit is to be a measurement subframe or a low-interference subframe, wherein the measurement subframe includes at least one symbol occupying a time-frequency resource on which a user equipment detects the at least one symbol;
    compare the output of the function with a threshold value, wherein the output of the function is determined based on a pseudo-random sequence and network cell information, the pseudo-random sequence is determined by the following:

$c(n) = (x_1(n+N_c) + x_2(n+N_c)) \bmod 2$, and the threshold value is associated with a probability that the type of the positioning subframe is a low-interference subframe;
    in response to the output of the function being different from the threshold value, determine that the type of the positioning subframe is a measurement subframe; and
    in response to the output of the function matching the threshold value, determine that the type of the positioning subframe is a low-interference subframe; and
  a subframe transmitting unit configured to transmit the determined type of positioning subframe.

9. The network node of claim 8, wherein the subframe transmitting unit is configured to transmit the determined type of positioning subframe in a cell of the network, wherein the network node further comprises a cell identifier obtaining unit configured to obtain a cell identifier for the cell, wherein the at least one parameter includes the cell identifier, and wherein the processor is configured to determine the type of the positioning subframe to transmit in said cell based upon a comparison.

10. The network node of claim 8, wherein the threshold value is common to each cell in the wireless communication network for determining the type of positioning subframe to transmit in that cell.

11. The network node of claim 8, wherein the subframe transmitting unit is further configured to transmit the threshold value to a user equipment configured to perform positioning measurements on positioning subframes.

12. The network node of claim 8, wherein the user equipment performs positioning measurements on the at least one symbol.

13. The network node of claim 8, wherein a low-interference subframe is transmitted in a cell on a frequency resource and contributes no more than minimal interference to measurement subframes transmitted by neighboring cells on that same frequency resource.

14. The network node of claim 8, wherein the node is an evolved NodeB.

15. The network node of claim 8, wherein the subframe transmitting unit is configured to transmit the determined type of positioning subframe in a cell of the wireless communication network.

16. The network node of claim 8, wherein a subframe has one or more parts within which data scheduled for transmission during that subframe is to be included, the data distinguished from control signaling, and wherein a low-interference subframe is a subframe which has less than a maximum possible amount of data scheduled within the one or more parts.

17. The method of claim 1, wherein the low-interference subframe comprises at least one reference symbol.

18. The network node of claim 8, wherein the low-interference subframe comprises at least one reference symbol.

19. The network node of claim 8, wherein the node is a user equipment.

* * * * *